US012714152B2

(12) United States Patent
Kim et al.

(10) Patent No.: US 12,714,152 B2
(45) Date of Patent: Aug. 25, 2026

(54) AEROSOL GENERATING APPARATUS AND OPERATING METHOD OF THE SAME

(71) Applicant: KT&G CORPORATION, Daejeon (KR)

(72) Inventors: Yong Hwan Kim, Gyeonggi-do (KR); Wang Seop Lim, Gyeonggi-do (KR); Sung Wook Yoon, Gyeonggi-do (KR); Seung Won Lee, Gyeonggi-do (KR); Dae Nam Han, Seoul (KR)

(73) Assignee: KT&G Corporation, Daejeon (KR)

( * ) Notice: Subject to any disclaimer, the term of this patent is extended or adjusted under 35 U.S.C. 154(b) by 532 days.

(21) Appl. No.: 17/800,298

(22) PCT Filed: Apr. 29, 2021

(86) PCT No.: PCT/KR2021/005460
§ 371 (c)(1),
(2) Date: Aug. 17, 2022

(87) PCT Pub. No.: WO2021/246652
PCT Pub. Date: Dec. 9, 2021

(65) Prior Publication Data

US 2023/0065955 A1 Mar. 2, 2023

(30) Foreign Application Priority Data

Jun. 5, 2020 (KR) ........................ 10-2020-0068597

(51) Int. Cl.
*G06F 21/32* (2013.01)
*A24F 40/51* (2020.01)
(Continued)

(52) U.S. Cl.
CPC .............. *A24F 40/53* (2020.01); *A24F 40/51* (2020.01); *A24F 40/60* (2020.01); *G06F 21/32* (2013.01);
(Continued)

(58) Field of Classification Search
CPC ........... A24F 40/60; A24F 40/20; G06F 21/32
See application file for complete search history.

(56) References Cited

U.S. PATENT DOCUMENTS 8,807,131 B1 * 8/2014 Tunnell ............. A61M 15/0021
128/200.14
10,176,894 B2 1/2019 Park et al.
(Continued)

FOREIGN PATENT DOCUMENTS

JP 2019-42500 A 3/2019
JP 2020-68739 A 5/2020
(Continued)

OTHER PUBLICATIONS

Extended European Search Report dated Jun. 28, 2023 in European Application No. 21818722.7.
(Continued)

*Primary Examiner* — David J Pearson
(74) *Attorney, Agent, or Firm* — Foley & Lardner LLP

(57) ABSTRACT

An aerosol generating apparatus according to an embodiment may include a housing; a heater configured to heat an aerosol generating material inserted into the housing; an optical sensor configured to sense an optical signal reflected from a user's hand; and a processor configured to: obtain fingerprint information of a user from the optical signal sensed by the optical sensor, determine whether the user is authorized to use the aerosol generating apparatus based on the obtained fingerprint information, obtain heart rate information from the sensed optical signal based on the user being determined to be an authorized user, and control power supplied to the heater based on the heart rate information.

10 Claims, 10 Drawing Sheets

(51) Int. Cl.
*A24F 40/53* (2020.01)
*A24F 40/60* (2020.01)
*G06V 40/12* (2022.01)
*G06V 40/13* (2022.01)

(52) U.S. Cl.
CPC ...... *G06V 40/1318* (2022.01); *G06V 40/1365* (2022.01)

(56) References Cited

U.S. PATENT DOCUMENTS 10,925,316 B2 2/2021 Batista et al.
11,559,211 B2 * 1/2023 Jeong ................. A61B 5/14517
2004/0186390 A1 * 9/2004 Ross ...................... A61B 5/083 600/532
2015/0057965 A1 * 2/2015 Gaynor .................. A01K 97/00 702/141
2015/0374310 A1 * 12/2015 Lee ....................... A61B 5/1118 600/483
2016/0004224 A1 * 1/2016 Pi ......................... G04G 21/025 368/10
2017/0032168 A1 * 2/2017 Kim .................... H04L 63/0861
2017/0112195 A1 4/2017 Sur et al.
2017/0127727 A1 * 5/2017 Davidson .............. A61M 15/06
2017/0127960 A1 * 5/2017 Jang ..................... A61B 5/7221
2017/0303593 A1 10/2017 Cameron et al.
2018/0018500 A1 * 1/2018 Wu ........................ G06V 40/40
2018/0055454 A1 3/2018 Newberry
2018/0098574 A1 4/2018 Sur et al.
2018/0132528 A1 5/2018 Sur et al.
2018/0279918 A1 10/2018 Hagen et al.
2018/0338527 A1 * 11/2018 Sur .......................... A61B 5/33
2019/0011288 A1 * 1/2019 Nassar ................. H03K 17/955
2019/0053540 A1 2/2019 Baker et al.
2019/0069781 A1 3/2019 Kim et al.
2019/0125221 A1 * 5/2019 Kobayashi ............ G06T 1/0007
2020/0113344 A1 * 4/2020 Youngblood ............ A61B 5/11
2021/0011446 A1 * 1/2021 Anderson ............... G06F 21/35
2021/0145338 A1 * 5/2021 Borthakur .............. G16H 10/20
2022/0110372 A1 * 4/2022 Bessant .............. A61B 5/02416
2023/0146370 A1 * 5/2023 Moloney ................ G16H 40/60 131/329

FOREIGN PATENT DOCUMENTS

KR 10-2015-0043831 A 4/2015
KR 10-2016-0108051 A 9/2016
KR 10-2018-0015622 A 2/2018
KR 10-2019-0027238 A 3/2019
KR 10-2019-0077091 A 7/2019
KR 10-2019-0143146 A 12/2019
KR 10-2020-0000481 A 1/2020
KR 10-2020-0050868 A 5/2020
WO 2019/060305 A1 3/2019
WO WO-2021083955 A1 * 5/2021 ............. A24F 40/51
WO WO-2021094380 A1 * 5/2021 ........... A61B 5/0533

OTHER PUBLICATIONS

Japanese Office Action dated Oct. 17, 2023 in Application No. 2022-560501.

Office Action dated Oct. 20, 2022 issued by the Korean Patent Office in Korean Application No. 10-2020-0068597.

International Search Report of PCT/KR2021/005460 dated Sep. 7, 2021 [PCT/ISA/210].

Written Opinion of PCT/KR2021/005460 dated Sep. 7, 2021 [PCT/ISA/237].

Korean Office Action of No. 10-2020-0068597 dated Dec. 16, 2021.

Korean Office Action of No. 10-2020-0068597 dated Jun. 21, 2022.

* cited by examiner

NOISE CAUSED BY MOTION
465
466
450
400
465
466
450
400

AEROSOL GENERATING APPARATUS AND OPERATING METHOD OF THE SAME

CROSS REFERENCE TO RELATED APPLICATIONS

This application is a National Stage of International Application No. PCT/KR2021/005460 filed on Apr. 29, 2021, claiming priority based on Korean Patent Application No. 10-2020-0068597 filed on Jun. 5, 2020.

TECHNICAL FIELD

The present disclosure relates to an aerosol generating apparatus and an operating method of the same.

BACKGROUND ART

Recently, the demand for an alternative to traditional cigarettes has increased. For example, there is growing demand for an aerosol generating apparatus which generates an aerosol by heating an aerosol generating material, rather than by combusting cigarettes. Accordingly, researches on a heating-type aerosol generating apparatus has been actively conducted.

DISCLOSURE OF INVENTION

Technical Problem

There is a need for an aerosol generating apparatus capable of obtaining biometric information of a user and verifying an authorized user according to biometric information.

The problem to be solved by the present invention is not limited to the above-described problem, and problems that are not mentioned will be clearly understood by those of ordinary skill in the art from the present specification and the accompanying drawings.

Solution to Problem

An aerosol generating apparatus according to an embodiment may include a housing; a heater configured to heat an aerosol generating material inserted into the housing; a battery; an optical sensor configured to sense an optical signal reflected from a user's hand; and a processor configured to: obtain fingerprint information of a user from the optical signal sensed by the optical sensor, determine whether the user is authorized to use the aerosol generating apparatus based on the obtained fingerprint information, obtain heart rate information from the sensed optical signal based on the user being determined to be an authorized user, and control power supplied from the battery to the heater based on the heart rate information.

According to another embodiment, an operating method of an aerosol generating apparatus for heating an aerosol generating material may include sensing an optical signal reflected from a user's hand; obtaining fingerprint information of a user from the optical signal; determining whether the user is authorized to use the aerosol generating apparatus based on the obtained fingerprint information; sensing an optical signal reflected from the user's hand based on the user being determined to be an authorized user; obtaining heart rate information of the user from the optical signal; and controlling the aerosol generating apparatus based on the heart rate information.

Advantageous Effects of Invention

The aerosol generating apparatus according to an embodiment may improve security for authorized users by integrally operating a security sensor, a sensor for measuring biometric information, and various sensors.

In addition, the aerosol generating apparatus according to an embodiment can perform an operation optimized for the authorized user based on the accumulated biometric information about the authorized user and can perform an optimized operation in response to changes in the surrounding environment, by integrally operating a security sensor, a biometric information measurement sensor, and various sensors.

The effects of the embodiments are not limited to the above-described effects, and effects that are not mentioned will be clearly understood by those of ordinary skill in the art from the present disclosure and the accompanying drawings.

MODE FOR THE INVENTION

Figure 1:
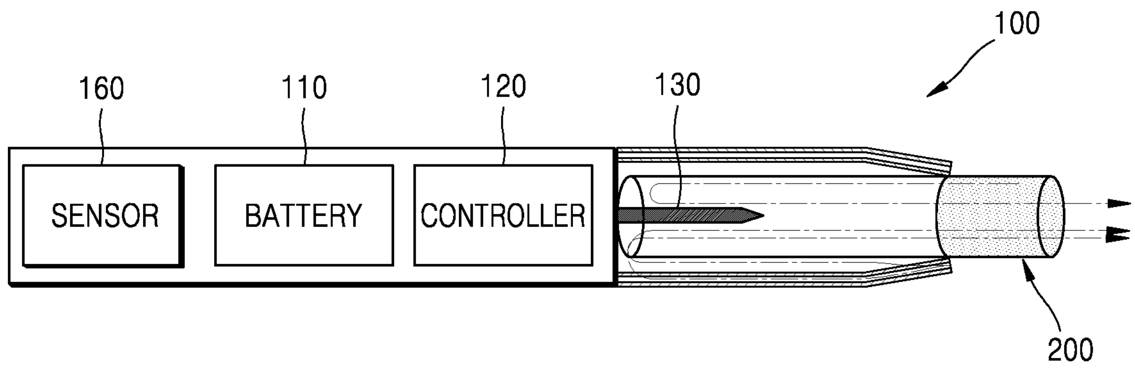
FIG. 1 is a block diagram showing the configuration of an aerosol generating apparatus according to an embodiment.

With respect to the terms used to describe in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

The term "aerosol generating article" may refer to any article that is designed for smoking by a person puffing on the aerosol generating article. The aerosol generating article may include an aerosol generating material that generates aerosols when heated even without combustion. For example, one or more aerosol generating articles may be loaded in an aerosol generating apparatus and generate aerosols when heated by the aerosol generating apparatus. The shape, size, material, and structure of the aerosol generating article may differ according to embodiments. Examples of the aerosol generating article may include, but are not limited to, a cigarette-shaped substrate and a cartridge. Hereinafter, the term "cigarette" (i.e., when used alone without a modifier such as "general," "traditional," or "combustive") may refer to an aerosol generating article which has a shape similar to a traditional combustive cigarette.

The term "downstream" refers to a lengthwise direction of the aerosol generating article along which the aerosol moves toward the mouth of a user in the aerosol generating article during smoking, and the term "upstream" refers to its opposite direction. The terms "downstream" and "upstream" may be used to indicate relative positions of components of the aerosol generating article.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Figure 2:
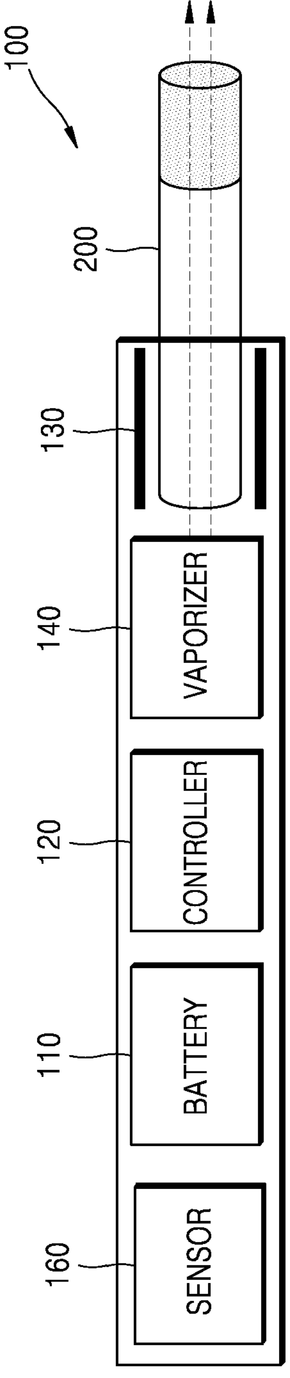
FIG. 2 is a block diagram showing the configuration of an aerosol generating apparatus according to another embodiment.
Figure 3:
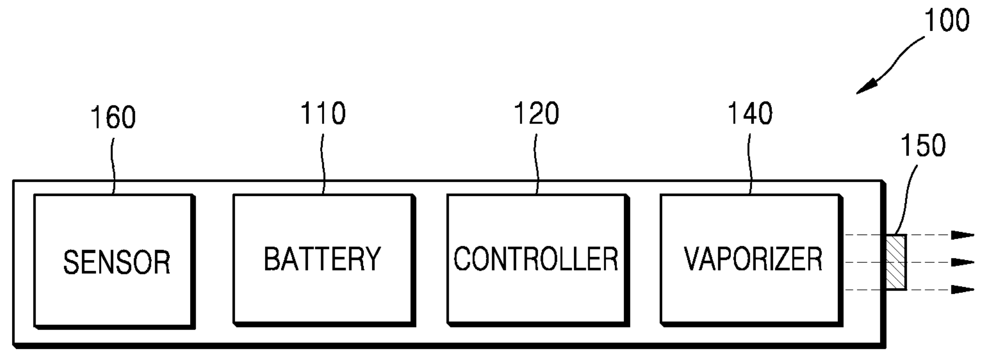
FIG. 3 is a block diagram showing the configuration of an aerosol generating apparatus according to another embodiment.

FIG. 1 is a block diagram showing the configuration of an aerosol generating apparatus according to an embodiment, FIG. 2 is a block diagram showing the configuration of an aerosol generating apparatus according to another embodiment, and FIG. 3 is a block diagram showing the configuration of an aerosol generating apparatus according to another embodiment.

Referring to FIG. 1, the aerosol generating apparatus 100 may include a battery 110, a heater 130, a sensor 160 and a controller 120. Referring to FIG. 2, the aerosol generating apparatus 100 may include a battery 110, a heater 130, a sensor 160, a vaporizer 140, and a controller 120. Referring to FIG. 3, the aerosol generating apparatus 100 may include a battery 110, a vaporizer 140, a sensor 160, an aerosol providing unit 150, and a controller 120.

According to an embodiment, an aerosol generating article (e.g., a cigarette 200) may be inserted into the aerosol generating apparatus 100. The aerosol generating apparatus 100 may heat a cigarette and/or a liquid aerosol generating material by supplying power to the heater 130 or the vaporizer 140.

However, the internal structure of the aerosol generating apparatus 100 is not limited to the structures illustrated in FIGS. 1 through 3. According to the design of the aerosol generating apparatus 100, it will be understood by one of ordinary skill in the art that some of the components shown in FIGS. 1 through 3 may be omitted or new components may be added. For example, the aerosol generating apparatus 100 may further include a user interface, a memory, and other types of sensors 160.

In an embodiment, the vaporizer 140 may be provided in a cartridge that may be detachable from the main body of the aerosol generating apparatus 100. In this case, hardware components of the aerosol generating apparatus 100 may be distributedly arranged in the main body and the vaporizer 140.

Hereinafter, a space in which each component included in the aerosol generating apparatus 100 is located is not limited, and an operation of each component will be described.

The battery 110 supplies power to be used for the aerosol generating apparatus 100 to operate. In other words, the battery 110 may supply power such that the heater 130 or the vaporizer 140 may be heated. Power supplied from the battery 110 to the heater 130 or the vaporizer 140 may be controlled by the controller 120. The battery 110 may start supplying power to the heater 130 or the vaporizer 140, increase or decrease the supplied power, or cut off the supplied power depending on a command of the controller 120.

In addition, the battery 110 may supply power required for operation of other components included in the aerosol generating apparatus 100, that is, the sensor 160, a user interface, a memory, and the controller 120. The battery 110 may be a rechargeable battery or a disposable battery. For example, the battery 110 may be a lithium polymer (LiPoly) battery, but is not limited thereto.

The heater 130 or the vaporizer 140 receives power from the battery 110 under the control of the controller 120. The heater 130 may receive power from the battery 110 to heat the cigarette inserted into the aerosol generating apparatus 100, and the vaporizer 140 may heat a liquid aerosol generating material contained in the vaporizer or in a separate liquid storage.

The heater 130 may be located in the main body of the aerosol generating apparatus 100 and/or in the vaporizer 140. When the heater 130 is located in the vaporizer 140, the heater 130 may receive power from the battery 110.

The heater 130 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater 130 may be implemented by a metal wire, a metal plate on which an electrically conductive track is arranged, or a ceramic heating element, but is not limited thereto.

In an embodiment, the heater 130 may be a component included in the vaporizer 140. The vaporizer 140 may include the heater 130, the liquid delivery element, and the liquid storage. The aerosol generating material accommodated in the liquid storage may be moved to the liquid delivery element, and the heater 130 may heat the aerosol generating material absorbed by the liquid delivery element, thereby generating aerosol. For example, the heater 130 may include a material such as nickel chromium and may be wound around or arranged adjacent to the liquid delivery element.

In another embodiment, the heater 130 may heat the aerosol generating article inserted into the accommodation space of the aerosol generating apparatus 100. As the aerosol generating article is accommodated in the accommodation space of the aerosol generating apparatus 100, the heater 130 may be located inside and/or outside the aerosol generating article. Accordingly, the heater 130 may generate aerosol by heating the aerosol generating material in the aerosol generating article.

The heater 130 may include an induction heater. The heater 130 may include an electrically conductive coil for heating an aerosol generating article or the vaporizer 140 in an induction heating method, and the aerosol generating article or the vaporizer 140 may include a susceptor which may be heated by the induction heater.

The aerosol generating material heated by the heater 130 may vaporized into an aerosol when a predetermined temperature is reached or a predetermined amount of heat energy is transmitted. The aerosol may be discharged to the outside of the aerosol generating apparatus 100 through an aerosol providing unit 150 by the user's inhalation, and may be provided to the user.

When the aerosol generating material is provided in the form of a cigarette, the aerosol providing unit 150 may be an accommodating unit in which the aerosol generating material is loaded for heating. The cigarette generates an aerosol when heated in the accommodating unit, and the aerosol may be discharged to the outside of the accommodating unit through the cigarette.

When the aerosol generating material is provided in the form of a liquid and stored in the vaporizer 140, the aerosol providing unit 150 may be a mouthpiece connected to the vaporizer 140. The liquid aerosol generating material may be transferred near a heater in the vaporizer 140 through a moving means such as a wick. The aerosol generating material is heated in the vaporizer 140 to generate an aerosol, and the generated aerosol may be provided to a user through the mouthpiece 150.

The aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the aerosol generating material may include other additives, such as flavors, a wetting agent, and/or organic acid. In addition, flavoring liquids such as menthol or moisturizer may be added to the aerosol generating material.

The aerosol generating apparatus 100 may include at least one sensor 160. A result of sensing by the at least one sensor 160 is transmitted to the controller 120, and the controller 120 may control the aerosol generating apparatus 100 to perform various functions such as controlling the operation of the heater 130, restricting smoking, determining whether an aerosol generating article (or the vaporizer 140) is inserted, and displaying a notification.

For example, the sensor 140 may include a puff detecting sensor. The puff detecting sensor may detect a user's puff based on any one of a temperature change, a flow change, a voltage change, and a pressure change.

The various types of sensors 160 for the aerosol generating apparatus 100 will be described in more detail later with reference to FIG. 4.

The controller 120 may control overall operation of the aerosol generating apparatus 100. The controller 120 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The controller 120 analyzes a result of the sensing by at least one sensor 160, and controls the processes that are to be performed subsequently.

The controller 120 may control power supplied to the heater 130 so that the operation of the heater 130 is started or terminated, based on the result of the sensing by the at least one sensor 160. In addition, based on the result of the sensing by the at least one sensor 160, the controller 120 may control the amount of power supplied to the heater 130 and the time at which the power is supplied, so that the heater 130 is heated to a predetermined temperature or maintained at an appropriate temperature.

In an embodiment, the controller 120 may set a mode of the heater 130 to a pre-heating mode to start the operation of the heater 130 after receiving a user input to the aerosol generating apparatus 100. In addition, the controller 120 may switch the mode of the heater 130 from the pre-heating mode to an operation mode after detecting a user's puff by using the puff sensor. In addition, the controller 120 may stop supplying power to the heater 130 when the number of puffs reaches a preset number after counting the number of puffs by using the puff sensor.

The controller 120 may control a user interface based on the result of the sensing by the at least one sensor 160. For example, when the number of puffs reaches the preset number after counting the number of puffs by using the puff sensor, the controller 120 may notify the user by using at least one of a light emitter, a motor, or a speaker that the aerosol generating apparatus 100 will soon be terminated.

Figure 4:
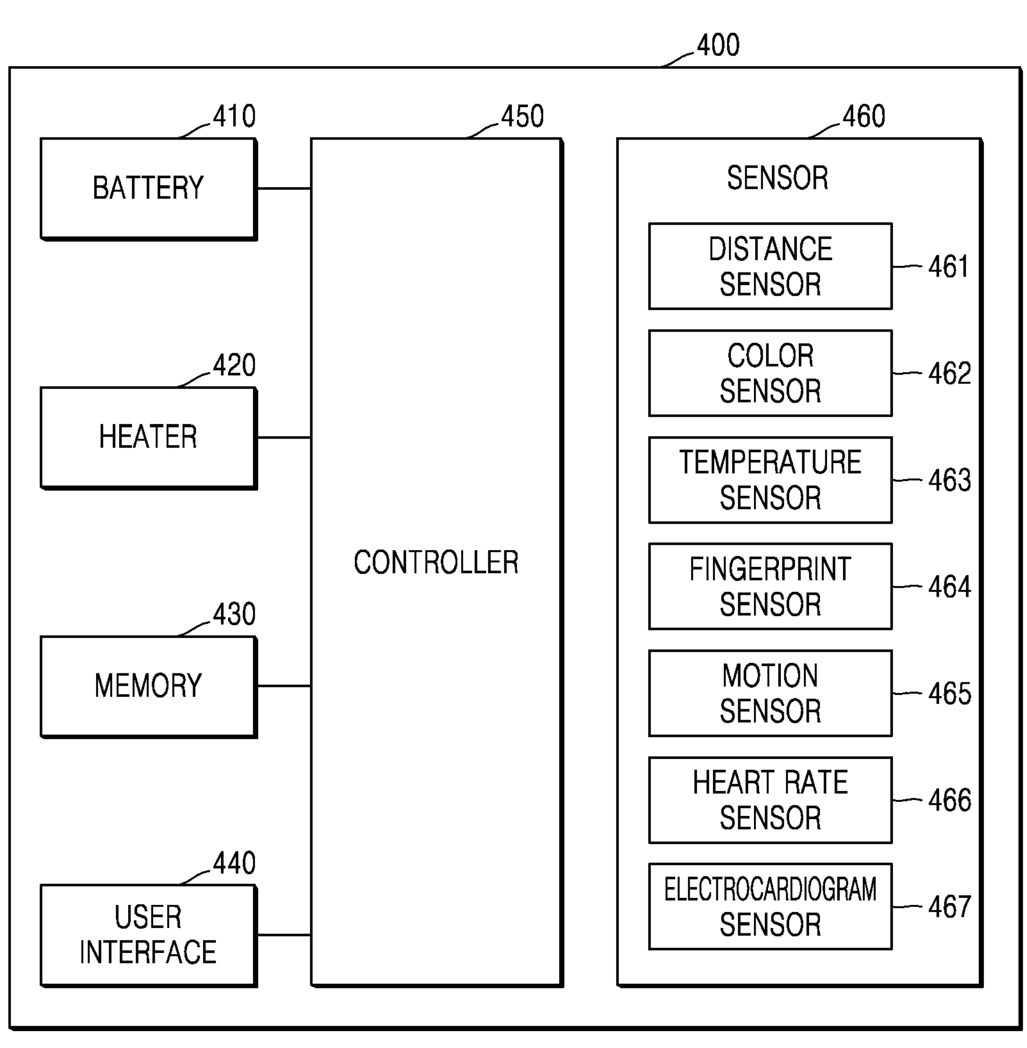
FIG. 4 is a block diagram showing the configuration of an aerosol generating apparatus according to an embodiment.

FIG. 4 is a block diagram showing the configuration of an aerosol generating apparatus 400 according to an embodiment.

Referring to FIG. 4, the aerosol generating apparatus 400 may include a battery 410, a heater 420, a memory 430, a user interface 440, a controller 450, and at least one sensor 460. The descriptions described in FIGS. 1 to 3 may also be applied to FIG. 4.

The sensor 460 may include a measurement element that measures a change in a predetermined physical quantity, and a processor that converts the change in the measured physical quantity into a digital value and obtains predetermined information from the change in the measured physical quantity.

The controller 450 may receive a signal measured by the sensor 460 and may obtain predetermined information from the signal.

The aerosol generating apparatus 400 may include various sensors, such as a distance sensor 461, a color sensor 462, a temperature sensor 463, a fingerprint sensor 464, a motion sensor 465, a heart rate sensor 466, and an electrocardiogram sensor 467. The above-described various sensors are classified based on the type of sensing information and the purpose of the sensor.

According to embodiments, various sensors may physically share the same hardware. For example, the fingerprint sensor 464 and the heart rate sensor 466 may include an element measuring the same optical signal and a processor processing the optical signal. The processor may obtain fingerprint information or heart rate information from an optical signal based on the type of sensor.

The distance sensor 461 may measure a distance by which an object is apart in a predetermined direction from the distance sensor 461. For example, the distance sensor 461 is disposed at the downstream end of the aerosol generating apparatus 400, and may measure a separation distance from the aerosol generating apparatus 400 to the user.

The distance sensor 461 may measure the separation distance to the object using various methods known in the art. For example, the distance sensor 461 may measure the separation distance to the target object by emitting an optical signal to the target object and detecting the optical signal reflected back from the target object.

For example, the distance sensor 461 may include a proximity sensor that measures a separation distance based on the brightness of an optical signal reflected from the target object, or a time of flight (TOF) sensor that measures a separation distance based on the time taken for an optical signal or an ultrasonic signal to return after reflecting from the target object.

The color sensor 462 may obtain color information about the surroundings of the aerosol generating apparatus 400 using various methods known in the art. For example, the color sensor 462 may detect a spectral intensity of light energy or a wavelength of an optical signal. The color sensor 462 may include a charge coupled device (CCD) or a complementary metal-oxide semiconductor (CMOS), or the like. The aerosol generating apparatus 400 may further include a display, and the display may display different colors based on the color information of the surroundings.

The temperature sensor 463 may detect a temperature of the heater 420 (or a temperature at which an aerosol generating material is heated). The aerosol generating apparatus 400 may include a separate temperature sensor 463 for sensing the temperature of the heater 420. Alternatively, instead of including a separate temperature sensor 463, the heater 420 itself may serve as a temperature sensor 463. In an embodiment, the heater 420 may serve as a temperature sensor while the temperature sensor 463 is separately included in the aerosol generating apparatus 400.

The temperature sensor 463 may measure the temperature of the heater 420 using various methods known in the art. For example, the temperature sensor 463 may be a thermistor using a change in resistance of a material due to temperature. Alternatively, the temperature sensor 463 may measure the temperature by using the thermal expansion of the liquid material based on the temperature change. Alternatively, the temperature sensor 463 may measure the temperature using electromagnetic waves emitted depending on the surface temperature.

When the temperature sensor 463 is a thermistor, the temperature sensor 463 may measure the voltage value, current value, or resistance value of the heater 420, and obtain the temperature value of the heater 420 by referring to a table in which the measured voltage value, current value, or resistance value of the heater 420 and the temperature value of the heater 420 are matched in advance. Alternatively, the temperature sensor 463 may directly calculate the temperature value of the heater 420 based on a formula defining the relationship between the measured voltage value, current value, or resistance value of the heater 420 and the temperature value of the heater 420.

The fingerprint sensor 464 may obtain fingerprint information from a user's finger in contact with the fingerprint sensor 464. The fingerprint sensor 464 may obtain the user's fingerprint information using various methods known in the art. For example, the fingerprint sensor 464 may measure fingerprint information in a variety of ways, such as an optical sensing method that digitizes the optical signal received by the light-receiving element after reflection from the fingerprint, a capacitive sensing method that detects the difference in capacitance between the valley and ridge of the fingerprint touching the sensor's surface, an ultrasonic sensing method, a thermal sensing method, etc.

The fingerprint sensor 464 may obtain feature points such as ridges, valleys, and sweat glands from the sensed fingerprint image, and verify the similarity between the fingerprint information stored in the database of the memory 430 and the feature points of the sensed fingerprint.

The motion sensor 465 may obtain motion information about a motion state, inclination, and posture of the aerosol generating apparatus 400. For example, the motion sensor 465 may sense a state in which the aerosol generating apparatus 400 is moving, a state in which the aerosol generating apparatus 400 is stopped, a state in which the aerosol generating apparatus 400 is inclined at an angle within a predetermined range for a puff, and a state in which the aerosol generating apparatus 400 is inclined at an angle outside the angle range corresponding to a puff action, The motion sensor 465 or the controller 450 connected to the motion sensor 465 may sense whether the user is moving while holding the aerosol generating apparatus 400, information about whether the user performs an operation of lifting or lowering the aerosol generating apparatus 400 while smoking, based on the obtained motion information.

The motion sensor 465 may obtain motion information of the aerosol generating apparatus 400 using various methods known in the art. For example, the motion sensor 465 may include an acceleration sensor capable of measuring acceleration in three directions of the x-axis, y-axis, and z-axis, and a gyro sensor capable of measuring angular velocity in three directions.

The heart rate sensor 466 may detect user's heart rate information. The heart rate information includes a pulse signal electrically sensing the heartbeat. The heart rate sensor 466 is positioned on the outer surface of the aerosol generating apparatus 400 and may obtain heart rate information through a part of the user's body. For example, the heart rate sensor may obtain heart rate information from a user's hand gripping the housing of the aerosol generating apparatus 400.

The heart rate sensor 466 may sense heart rate information that changes as the user of the aerosol generating apparatus 400 inhales the aerosol. The heart rate sensor 466 may sense heart rate information before the user inhales the aerosol, heart rate information that changes while the user inhales the aerosol, and heart rate information after the user completes the aerosol inhalation.

According to an embodiment, the heart rate sensor 466 may be a photoplethysmography (PPG) sensor. As the volume of blood in the blood vessel changes due to the pulse, and the amount of light absorption changes accordingly. The PPG sensor may detect the change in the amount of light absorption. The heart rate sensor 466 is not limited to the PPG sensor, and may include all other types of sensors capable of sensing heart rate information such as heart rate variability.

The heart rate information may include pulse peak interval (PPI), RR Interval, heart rate, heart rate variability (HRV), pulse transfer time (PTT), and pulse wave velocity (PWV).

The PPI is a time interval between consecutive peaks. The lower the PPI is, the faster the heartbeat is because the time interval between the peaks is shorter. Likewise, the higher the PPI is, the slower the heartbeat is because the time interval between the peaks is longer.

The heart rate variability is information about changes in the PPI. The greater the amount of change in the PPI is, the greater the heart rate variability is. Likewise, the smaller the amount of change in the PPI, the lower the heart rate variability is.

The PPI and heart rate variability may include information about a user's stress level, psychological and health status. The controller 450 may control the battery 410 and the heater 420 based on the measured heart rate information and the user's stress level obtained from the heart rate information.

The heart rate sensor 466 or the controller 450 connected to the heart rate sensor 466 may determine that the user's stress level is lower and the user is in a healthy state as the heart rate variability is larger and irregular. In addition, the controller 450 may determine that the user's stress level increases and the health status decreases as the heart rate variability is small and periodic.

An electronic cardio graph (ECG) sensor may measure electrocardiogram information, which is an electrical signal related to an electrical activation stage of the heart. The electrocardiogram sensor 467 may obtain an impedance value through the contact surface of the electrocardiogram patch and obtain an electrocardiogram waveform. The electrocardiogram sensor 467 may measure timings of atrial depolarization P, ventricular depolarization QRS, and ventricular repolarization T. The electrocardiogram sensor 467 may determine whether the electrical activation stage of the heart is in a standard form based on the duration of each wave, the interval between the waves, the amplitude and the kurtosis of each wave.

The electrocardiogram sensor 467 may detect the user's electrocardiogram information from the two-pole contact points of both hands when the user simultaneously grips the aerosol generating apparatus 400 with the left and right hands.

The electrocardiogram sensor 467 may sense electrocardiogram information before inhaling the aerosol, a change in the electrocardiogram information while the user inhales the aerosol, and electrocardiogram information after the user completes inhaling the aerosol. The electrocardiogram information may include biometric information such as arrhythmia and blood pressure.

The sensor 460 that may be provided in the aerosol generating apparatus 400 is not limited to the above-described types, and may further include various sensors. According to an embodiment, the aerosol generating apparatus 400 may include an iris recognition sensor that analyzes the iris pattern of the pupil for user authentication and security, a vein recognition sensor that detects the absorption of infrared rays of reduced hemoglobin in veins from the palm image, a face recognition sensor that recognizes feature points such as eyes, nose, mouth and facial contours in 2D or 3D method, and a radio-frequency identification (RFID) sensor.

According to another embodiment, the aerosol generating apparatus 400 may further include a pressure sensor that measures altitude information based on a difference between the ambient pressure and the sea level standard air pressure, a touch sensor that detects a user's touch input, a humidity sensor that measures the humidity of the surrounding environment of the aerosol generating apparatus 400, a geomagnetic sensor that measures orientation or detects metal, and a gas sensor that detects gas contact on the surface of ceramic semiconductors.

The controller 450 may include at least one of an analog signal processor that filters only signals of appropriate characteristics, a data converter that converts analog signals into digital signals, and an information acquisition unit that processes digital signals to obtain predetermined information. The analog signal processor, the data converter, and the information acquisition unit are unit components classified according to functions, and may be implemented by one or more processors.

The controller 450 may analyze the obtained predetermined information and control processes to be performed subsequently. For example, the controller 450 may adjust power supplied from the battery 410 to the heater 420 based on the heart rate variability. The controller 450 may determine a user's stress level based on the heart rate information, and may adjust the heating intensity and aerosol generation amount of the heater 420 to reduce or maintain the stress level.

The controller 450 may control the activation state of the sensor 460. The controller 450 may cut off power supplied to the sensor 460 to deactivate the sensor 460. The controller 450 may reduce consumption of standby power by deactivating the sensor 460. When a predetermined trigger is detected, the controller 450 may reactivate the sensor 460 in an inactive state.

For example, when a user input for stopping the heating operation of the heater 420 is received through a button, or when the heating time of the heater 420 exceeds a predetermined time, the controller 450 may stop power supplied from the battery 410 to the heater 420 and deactivate the puff sensor.

The user interface 440 may provide information on the state of the aerosol generating apparatus 400 to the user. The user interface 440 may include various interfacing means such as a display or lamp that outputs visual information, a motor that outputs tactile information, a speaker that outputs sound information, terminals for charging or data communication, input/output (I/O) interfacing means (for example, a button or a touch screen) for receiving information input from the user or outputting information to the user, and a communication interfacing module for performing wireless communication with external devices (e.g., WI-FI, WI-FI Direct, Bluetooth, near-field communication (NFC), etc.).

However, in the aerosol generating apparatus 400, only some of the examples of the various user interfaces 440 illustrated above may be selected and implemented.

The memory 430 is hardware that stores various types of data processed in the aerosol generating apparatus 400, and the memory 430 may store data processed and data to be processed by the controller 450. The memory 430 may be implemented in various types, such as random access memory (RAM) such as dynamic random access memory (DRAM) and static random access memory (SRAM), read-only memory (ROM), and electrically erasable programmable read-only memory (EEPROM).

The memory 430 may store various pieces of information, such as an operation time of the aerosol generating apparatus 400, a maximum number of puffs, a current number of puffs, data at least one temperature profile, user's smoking pattern, information obtained from the sensor 460, a program for processing the obtained information, and predetermined threshold values.

Meanwhile, although not shown in FIGS. 1 to 4, the aerosol generating apparatus 400 may constitute an aerosol generating system together with a separate cradle. For example, the cradle may be used to charge the battery 410 of the aerosol generating apparatus 400. For example, the aerosol generating apparatus 400, while being accommodated in the accommodation space inside the cradle, may receive power from the battery 410 of the cradle to charge the battery 410 of the aerosol generating apparatus 400.

Figure 5:
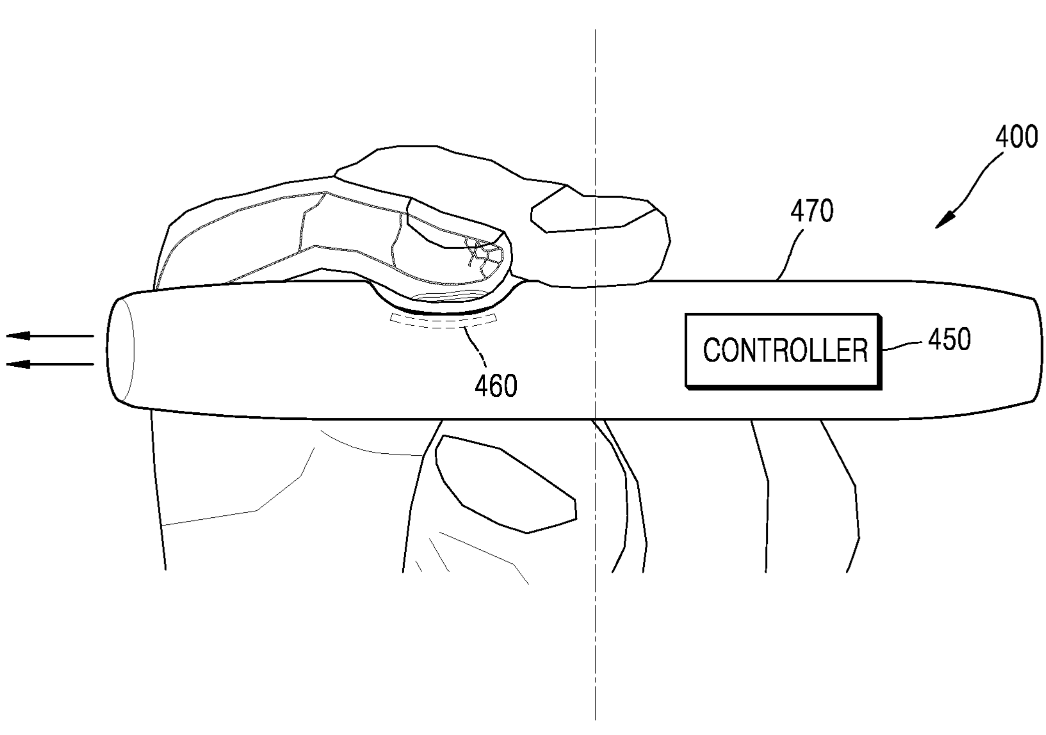
FIG. 5 is a diagram illustrating a state of use of an aerosol generating apparatus according to an embodiment.

FIG. 5 is a diagram illustrating a state of use of the aerosol generating apparatus 400 according to an embodiment.

Referring to FIG. 5, the aerosol generating apparatus 400 may include a housing forming an exterior. The housing extends in one direction and has a form similar to a cigarette. The user may inhale the aerosol through one end (i.e., downstream end) of the housing.

The sensor 460 may be positioned on the outer surface of the housing. On the outer surface of the housing, a recess may be formed that makes the aerosol generating apparatus 400 easy to grip. The sensor 460 may be positioned in the recess to contact a user's finger gripping the housing.

The sensor 460 may include a light-emitting module that irradiates an optical signal of a predetermined wavelength to the user's finger and a light-receiving module that receives an optical signal reflected from the user's finger or blood vessels inside the finger.

According to an embodiment, the controller 450 may receive an optical signal from the sensor 460, process the optical signal, and obtain predetermined information from the optical signal. The controller 450 may obtain various types of information from the optical signal. For example, the controller 450 may obtain user's fingerprint information and/or user's heart rate information from the optical signal.

That is, the optical signal measured by the sensor 460 may include various information including fingerprint information and/or heart rate information, and the sensor 460 may be operated as the fingerprint sensor 464 or the heart rate sensor 466 depending on the type of information that the controller 450 or the processor of the sensor 460 obtains from the optical signal.

According to an embodiment, an optical signal irradiated by the light-emitting module to obtain fingerprint information and an optical signal irradiated by the light-emitting module to obtain heart rate information may have different characteristics. For example, in order to obtain fingerprint information, the light-emitting module may irradiate an optical signal of a certain wavelength band having a high reflectivity for the surface of the finger. For example, in order to obtain heart rate information, the light-emitting module may irradiate an optical signal of a certain wavelength band having a high transmittance for the finger surface.

According to an embodiment, the fingerprint sensor 464 and the heart rate sensor 466 may be provided as separate hardware. The fingerprint sensor 464 and the heart rate sensor 466 may be positioned in close proximity to each other in the recess. Accordingly, when the user's finger contacts the recess, the fingerprint sensor 464 and the heart rate sensor 466 may obtain fingerprint information and heart rate information from the user's finger, respectively. In this case, the fingerprint sensor 464 may operate in an electrostatic method or an ultrasonic method.

The types of light used by the sensor 460 may vary. The sensor 460 may use two or more types of light at the same time. For example, the sensor 460 may obtain heart rate information by using infrared (IR) light, green light, or red light. Accordingly, the light-emitting module 137 may include an infrared light-emitting module, a green light-emitting module, and a red light-emitting module, and the light-receiving module 139 may include an infrared light-receiving module, a green light-receiving module, and a red light-receiving module.

The information obtained by the sensor 460 may be different depending on the type of light. According to an embodiment, the sensor 460 may detect that a body contacts the sensor 460 using infrared light. In addition, the sensor 460 may obtain heart rate information based on light reflecting from blood vessels, using green light having a high transmittance for the skin.

Figure 6:
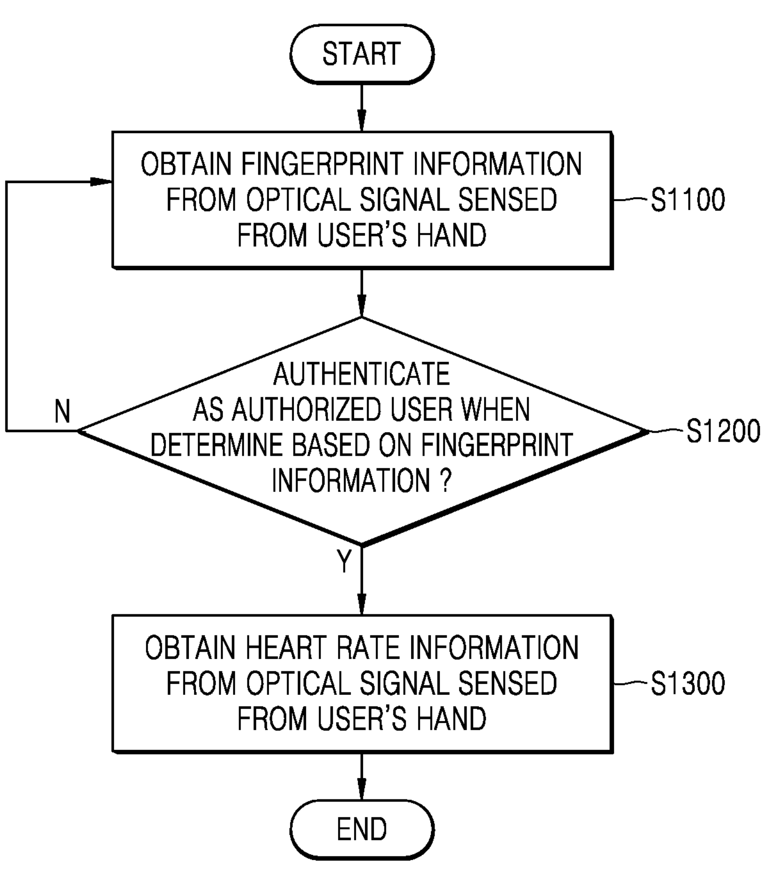
FIG. 6 is a flowchart illustrating an operating method of an aerosol generating apparatus according to an embodiment.

FIG. 6 is a flowchart illustrating an operating method of the aerosol generating apparatus 400 according to an embodiment.

In operation S1100, the sensor 460 may sense an optical signal from a user's hand. Also, the controller 450 may obtain fingerprint information from the optical signal sensed by the optical sensor.

In operation S1200, the controller 450 may perform an authentication process based on the fingerprint information. The controller 450 may authenticate the authorized user by comparing the fingerprint information of the authorized user stored in the memory 430 with the fingerprint information sensed by the optical sensor.

According to embodiments, there may be a plurality of authorized users. The fingerprint information about a plurality of authorized users may be stored in the memory 430. The controller 450 may identify the current user requesting authorization from among a plurality of authorized users based on information sensed by the optical sensor.

In operation 1300, when the authorized user is authenticated, the controller 450 may obtain heart rate information from the optical signal sensed by the optical sensor. After the authorized user is authenticated, the optical sensor may sense the optical signal again. The controller 450 may obtain heart rate information from an optical signal sensed by the optical sensor and display heart rate information in real time through the user interface 440.

The measured heart rate information of the authorized user may be recorded in the memory 430. The controller 450 may compare and analyze past heart rate information and currently measured heart rate information. According to embodiments, when there are a plurality of authorized users, the controller 450 may record heart rate information currently measured under the account of the current user.

When the user is authenticated, the controller 450 may change characteristics of an optical signal irradiated by the light-emitting module in order to obtain heart rate information. For example, after the user is authenticated, the controller 450 may irradiate green light with high transmittance for the skin through the light-emitting module.

Accordingly, the aerosol generating apparatus 400 may monitor heart rate information of the user who is authenticated based on the fingerprint information. The aerosol generating apparatus 400 may save power required to obtain or display the heart rate information by monitoring or displaying heart rate information only when the use is authenticated.

In addition, the aerosol generating apparatus 400 may obtain the fingerprint information and the heart rate information by the user's single action of gripping a recess. The authorized user may be authenticated simply by gripping the recess and may continuously monitor heart rate information.

When the user authentication fails, the controller 450 may return to operation S1100 to obtain fingerprint information for user authentication.

Figure 7:
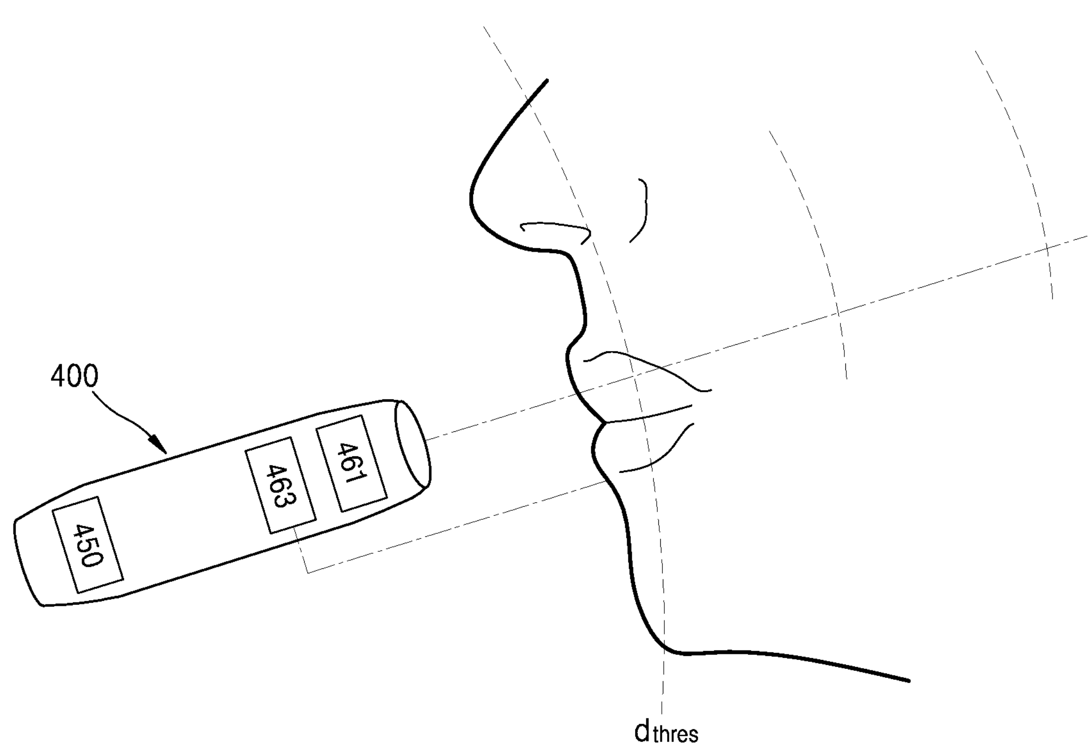
FIG. 7 is a diagram illustrating a state of use of an aerosol generating apparatus according to an embodiment.

FIG. 7 is a diagram illustrating a state of use of the aerosol generating apparatus 400 according to an embodiment.

Referring to FIG. 7, the aerosol generating apparatus 400 may include a distance sensor 461 that measures distance information from a user, and a temperature sensor 463 that measures temperature information of a user. The distance sensor 461 is positioned at a proximal end (i.e., downstream end) of the aerosol generating apparatus 400, and may measure a separation distance of a user from the aerosol generating apparatus 400. The temperature sensor 463 is positioned at the proximal end of the aerosol generating apparatus 400 and may measure the user's temperature.

The temperature sensor 463 may operate in a non-contact manner by measuring the user's temperature based on the energy of infrared rays emitted from the user. The accuracy of the non-contact temperature sensor 463 may be varied depending on the separation distance between the temperature sensor 463 and a target object. Accordingly, the temperature sensor 463 may measure the user's temperature when the user is located within a predetermined distance (dsense<dthres) to improve the accuracy. The controller 450 may control the operating state of the temperature sensor 463 based on the user's separation distance.

Figure 8:
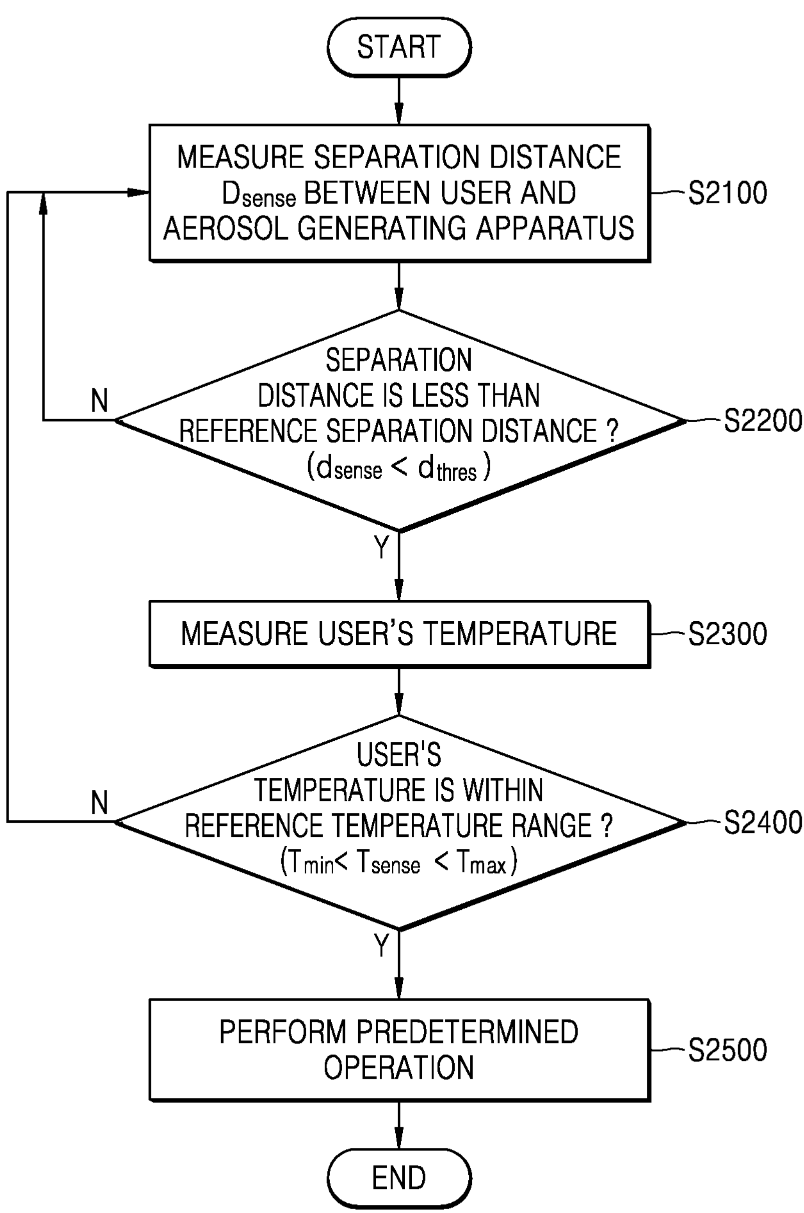
FIG. 8 is a flowchart illustrating an operating method of an aerosol generating apparatus according to an embodiment.

FIG. 8 is a flowchart illustrating an operating method of the aerosol generating apparatus 400 according to an embodiment.

Referring to FIG. 8, in operation S2000, the distance sensor 461 may measure a separation distance dsense between a user and the aerosol generating apparatus 400.

In operation S2200, the controller 450 may determine whether the separation distance sensed by the distance sensor 461 is less than the reference separation distance (dsense<dthres). The reference separation distance dthres is a maximum distance at which the temperature sensor 463 may accurately measure the user's temperature, and may be experimentally determined in advance and stored in the memory 430.

When the separation distance sensed by the distance sensor 461 is less than the reference separation distance (dsense<dthres), the controller 450 may operate the temperature sensor 463 to measure the user's temperature in operation S2300. The controller 450 may activate the temperature sensor 463 by supplying power from the battery 410 to the temperature sensor 463.

In operation S2400, the controller 450 may determine whether the user's temperature is within the reference temperature range (T min<Tsense<T max). The reference temperature range is a range recognized as the user's normal body temperature. For example, the minimum temperature T min may be 35.5° C. and the maximum temperature T max may be 37.5° C., such that the reference temperature range includes 36.5° C.

When the user's temperature is within the reference temperature range (T min<Tsense<T max), the controller 450 may perform a predetermined operation in operation S2500. In this case, the controller 450 may check again whether the user is within the reference separation distance dthres, and may not perform the predetermined operation if the user is not within the reference separation distance dthres.

The predetermined operation in S2500 may be allowing the user to smoke. For example, the predetermined operation may be an operation of supplying power to the heater 420 and/or the vaporizer 140. As a result, the controller 450 may shorten the time required for smoking by preheating the aerosol generating material as it senses that the user approaches.

For another example, the predetermined operation may be an operation of activating a puff sensor. Accordingly, the controller 450 may activate the puff sensor as the user approaches, and deactivate the puff sensor when the user does not approach, thereby saving the standby power required for the puff sensor.

Figure 9:
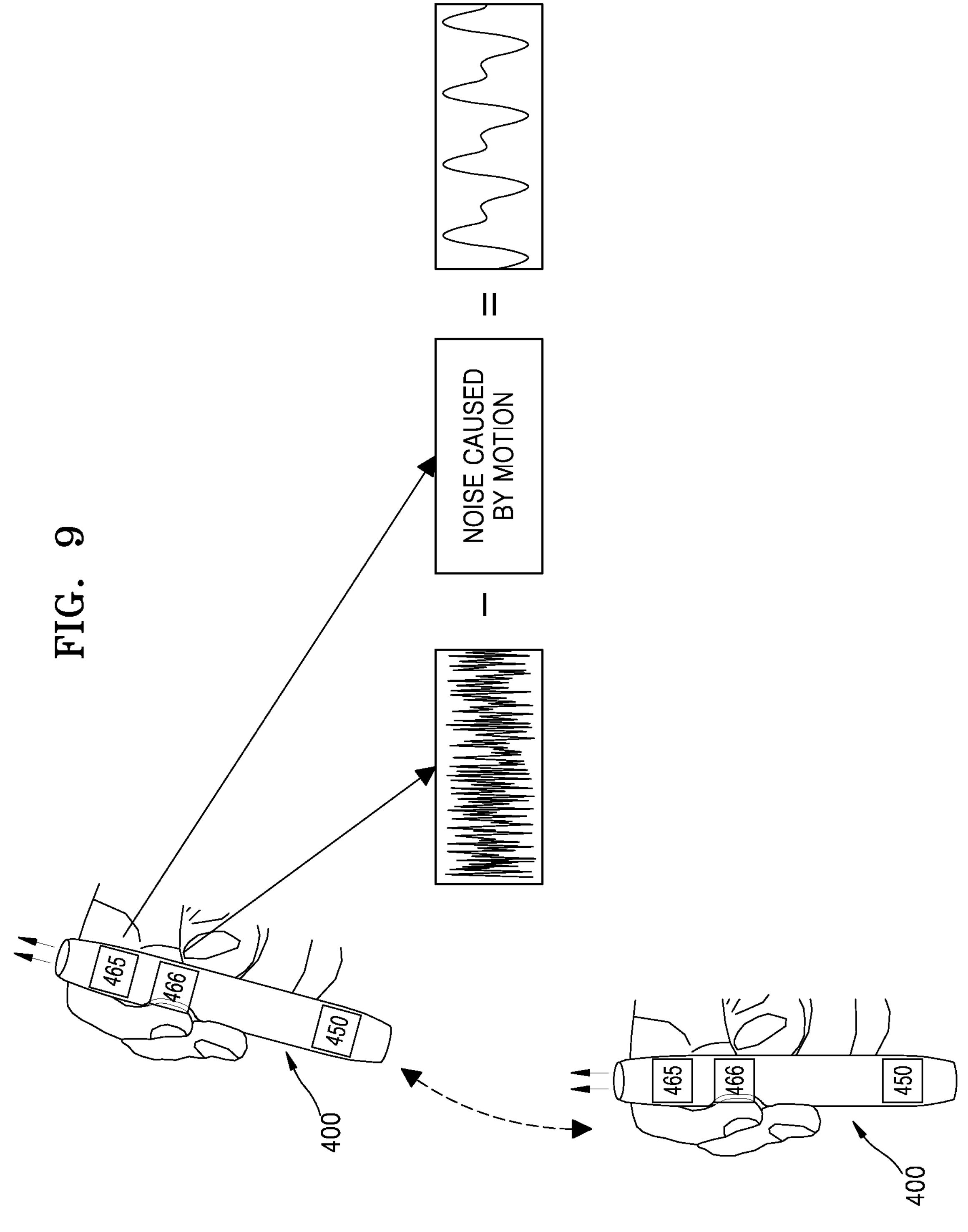
FIG. 9 is a diagram illustrating a state of use of an aerosol generating apparatus according to an embodiment.

FIG. 9 is a diagram illustrating a state of use of an aerosol generating apparatus 400 according to an embodiment.

Referring to FIG. 9, the aerosol generating apparatus 400 may move up and down during the user's smoking. A motion sensor 465 may sense motion information of the aerosol generating apparatus 400. A heart rate sensor 466 may measure user's heart rate information.

According to an embodiment, the aerosol generating apparatus 400 may measure the heart rate information when in a stopped state (i.e., when the movement of the aerosol generating apparatus 400 has stopped). For example, a controller 450 may determine the stopped state of the aerosol generating apparatus 400 based on the motion information measured by the motion sensor 465. When the aerosol generating apparatus 400 is determined to be in the stopped state, the controller 450 may measure heart rate information by driving a heart rate sensor 466. Accordingly, it is possible to prevent noise from being generated in heart rate information, caused by the movement of the aerosol generating apparatus 400.

According to another embodiment, the aerosol generating apparatus 400 may measure heart rate information of the user even when it is in a motion state (i.e., when aerosol generating apparatus 400 is moving). In this case, however, the heart rate sensor 466 may misrecognize the vibration caused by the motion of the aerosol generating apparatus 400 as a heartbeat, and the heart rate information may include noise caused by the motion of the aerosol generating apparatus 400.

Information about noise generated by the motion of the aerosol generating apparatus 400 which affects the heart rate information may be stored in the memory 430. This noise information may be obtained experimentally or may be calculated by a formula. In particular, information about the noise generated when the aerosol generating apparatus 400 moves up or moves down during user's smoking may be pre-stored in the memory 430. The controller 450 may correct the measured heart rate information by removing the noise based on the noise information stored in the memory 430.

Figure 10:
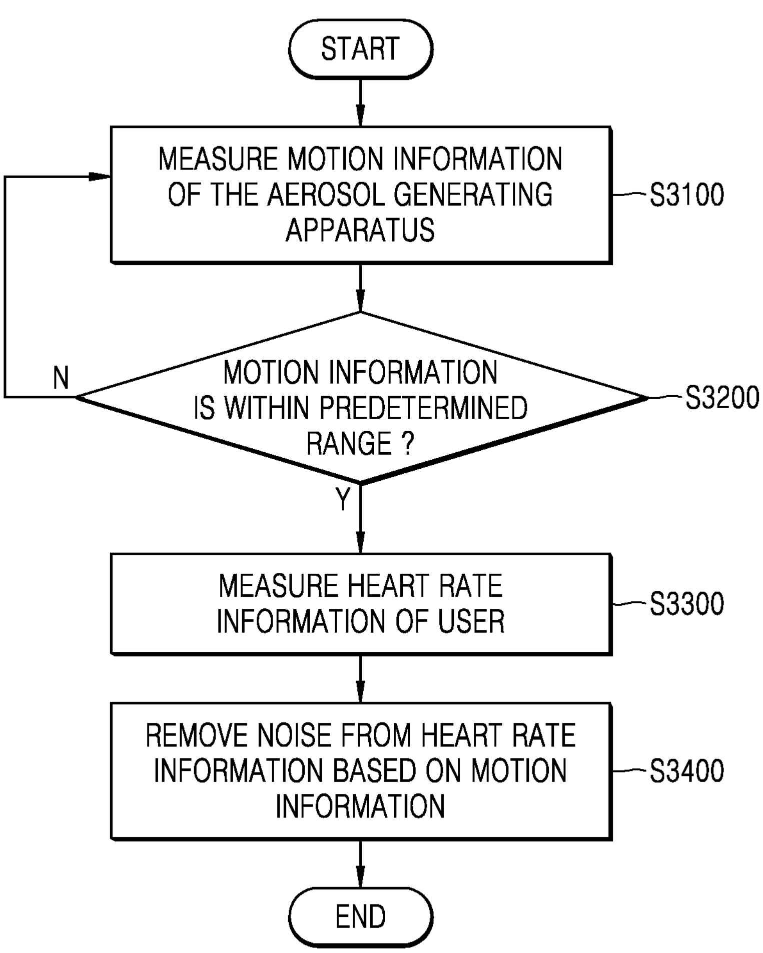
FIG. 10 is a flowchart illustrating an operating method of an aerosol generating apparatus according to an embodiment.

FIG. 10 is a flowchart illustrating an operating method of the aerosol generating apparatus 400 according to an embodiment.

Referring to FIG. 10, in operation S3100, the motion sensor 465 may measure motion information of the aerosol generating apparatus 400. The controller 450 may obtain the motion information of the aerosol generating apparatus 400 from the motion sensor 465.

In operation S3200, the controller 450 may determine whether the motion information is within a predetermined range. According to an embodiment, the predetermined range may represent a range of motion measured when the aerosol generating apparatus 400 is in a stopped state. Alternatively, the predetermined range may represent a range of motion of the aerosol generating apparatus 400 which does not affect the accuracy of the heart rate sensor 466. When the aerosol generating apparatus 400 moves rapidly, the accuracy of the heart rate sensor 466 may deteriorate.

According to another embodiment, the predetermined range may represent a range of motion generated while the aerosol generating apparatus 400 repeatedly rises or descends during user's smoking.

In operation S3300, when the motion information is within a predetermined range, the controller 450 may measure the user's heart rate information by driving the heart rate sensor 466. The heart rate sensor 466 may measure heart rate information from a user's finger of the aerosol generating apparatus 400.

In operation S3400, the controller 450 may remove noise from the heart rate information based on the motion information. The controller 450 may obtain noise for heart rate information, caused by motion of the aerosol generating apparatus 400 by referring to the memory 430. The controller 450 may improve the accuracy of the heart rate information by removing noise from the heart rate information measured by the motion sensor 465.

When the heart rate information is measured by the heart rate sensor 466 when the aerosol generating apparatus 400 is in a stopped state, the controller 450 may omit step S3400.

At least one of the components, elements, modules or units (collectively "components" in this paragraph) represented by a block in the drawings such as the controller 450 and the sensor 460, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those of ordinary skill in the art related to the present embodiments may understand that various changes in form and details can be made therein without departing from the scope of the characteristics described above. The scope of the present disclosure is defined by the appended claims rather than by the foregoing description, and all differences within the scope of equivalents thereof should be construed as being included in the present disclosure.

The invention claimed is:

1. An aerosol generating apparatus comprising:

a housing;

a heater configured to heat an aerosol generating material inserted into the housing;

an optical sensor configured to irradiate an optical signal toward a user's hand and sense an optical signal reflected from the user's hand;

a motion sensor configured to obtain motion information of the aerosol generating apparatus; and a processor configured to:

obtain fingerprint information of a user from the optical signal sensed by the optical sensor, determine whether the user is authorized to use the aerosol generating apparatus based on the obtained fingerprint information, based on the user being determined to be an authorized user, obtain heart rate information from a sensed optical signal reflected from the authorized user, determine a stress level of the user based on the heart rate information, and control power supplied to the heater based on the heart rate information to maintain or reduce the stress level of the user, wherein the stress level of the user is determined based on a heart rate variability of the user, wherein the processor is further configured to:

determine whether the motion information is within a predetermined range, and based on the motion information being within the predetermined range, obtain the heart rate information from the sensed optical signal reflected from the authorized user.

2. The aerosol generating apparatus of claim 1, wherein the optical sensor comprises:

a light-emitting unit configured to emit light toward the user's hand; and a light-receiving unit configured to receive light reflected from the user's hand.

3. The aerosol generating apparatus of claim 1, further comprising a motion sensor configured to obtain motion information of the aerosol generating apparatus, wherein the processor is configured to determine whether to obtain the heart rate information from the sensed optical signal reflected from the authorized user based on the motion information.

4. The aerosol generating apparatus of claim 3, wherein the processor is configured to obtain the heart rate information from the sensed optical signal reflected from the authorized user based on the motion information indicating that the aerosol generating apparatus is in a stopped state.

5. The aerosol generating apparatus of claim 3, wherein the motion sensor includes at least one of a gyroscope and an acceleration sensor.

6. The aerosol generating apparatus of claim 3, wherein the processor is configured to obtain, from the motion information, noise information about noise that is caused by motion of the aerosol generating apparatus and affects the heart rate information, and correct the heart rate information based on the noise information.

7. The aerosol generating apparatus of claim 1, further comprising a distance sensor configured to measure a distance between the user and the aerosol generating apparatus, and a temperature sensor configured to measure a temperature of the user, wherein the processor is configured to control the temperature sensor based on the measured distance.

8. The aerosol generating apparatus of claim 7, wherein the processor is configured to control the temperature sensor to measure the temperature based on the distance being less than a predetermined reference distance.

9. The aerosol generating apparatus of claim 1, further comprising a color sensor configured to obtain color information of a surrounding region, and a display, wherein the processor is configured to change a color displayed on the display, based on the color information.

10. An operating method of an aerosol generating apparatus, the method comprising:

sensing an optical signal reflected from a user's hand;

obtaining fingerprint information of a user from the optical signal;

determining whether the user is authorized to use the aerosol generating apparatus based on the obtained fingerprint information;

based on the user being determined to be an authorized user, sensing an optical signal reflected from the authorized user's hand;

obtaining heart rate information of the user from a sensed optical signal reflected from the authorized user's hand;

determining a stress level of the user based on the heart rate information;

controlling the aerosol generating apparatus based on the heart rate information to maintain or reduce the stress level of the user, wherein the stress level of the user is determined based on a heart rate variability of the user;

obtaining motion information of the aerosol generating apparatus;

determining whether the motion information is within a predetermined range, and based on the motion information being within the predetermined range, obtaining the heart rate information from the sensed optical signal reflected from the authorized user.

* * * * *